(12) United States Patent
Tsunekawa et al.

(10) Patent No.: US 9,181,640 B2
(45) Date of Patent: Nov. 10, 2015

(54) CARBON-FIBER CHOPPED STRAND AND MANUFACTURING METHOD OF THE SAME

(75) Inventors: Hiroshi Tsunekawa, Shizuoka (JP); Takao Saeki, Shizuoka (JP); Akio Yoshida, Shizuoka (JP)

(73) Assignee: TOHO TENAX CO., LTD., Tokyo (JP)

( * ) Notice: Subject to any disclaimer, the term of this patent is extended or adjusted under 35 U.S.C. 154(b) by 465 days.

(21) Appl. No.: 13/583,137

(22) PCT Filed: Feb. 28, 2011

(86) PCT No.: PCT/JP2011/054505
§ 371 (c)(1),
(2), (4) Date: Sep. 6, 2012

(87) PCT Pub. No.: WO2011/111559
PCT Pub. Date: Sep. 15, 2011

(65) Prior Publication Data
US 2012/0326342 A1    Dec. 27, 2012

(30) Foreign Application Priority Data

Mar. 8, 2010 (JP) ................... 2010-050008
Mar. 26, 2010 (JP) ................... 2010-071863

(51) Int. Cl.
| | |
|---|---|
| *D02G 3/02* | (2006.01) |
| *D02G 3/16* | (2006.01) |
| *D06M 15/59* | (2006.01) |
| *B29B 9/14* | (2006.01) |
| *D02G 3/26* | (2006.01) |
| *D06M 101/40* | (2006.01) |
| *B29C 47/00* | (2006.01) |
| *B29K 105/12* | (2006.01) |
| *C08K 9/08* | (2006.01) |
| *C08K 7/06* | (2006.01) |
| *C08L 77/00* | (2006.01) |
| *B29B 9/06* | (2006.01) |

(52) U.S. Cl.
CPC .. *D02G 3/16* (2013.01); *B29B 9/14* (2013.01); *D06M 15/59* (2013.01); *B29B 9/06* (2013.01); *B29C 47/0011* (2013.01); *B29K 2105/12* (2013.01); *C08K 7/06* (2013.01); *C08K 9/08* (2013.01); *C08L 77/00* (2013.01); *D02G 3/26* (2013.01); *D06M 2101/40* (2013.01); *D10B 2101/12* (2013.01); *Y10T 428/1334* (2015.01); *Y10T 428/2918* (2015.01)

(58) Field of Classification Search
CPC ............ B29B 9/14; B29B 9/06; B29B 11/10; B29B 11/16; D06M 2101/40; D10B 2101/12; B29C 47/0011; C08K 9/08; B29K 2105/12; D02G 3/26
USPC ............. 264/211.21, 211.22; 425/130, 131.1; 428/364, 367, 371, 401; 57/250, 258, 57/282, 292, 314
See application file for complete search history.

(56) References Cited

U.S. PATENT DOCUMENTS

| | | | |
|---|---|---|---|
| 5,227,238 A * | 7/1993 | Hirai et al. ................... | 428/369 |
| 5,639,410 A | 6/1997 | Amaike et al. | |
| 6,881,479 B2 | 4/2005 | Vancraeynest | |
| 2004/0028898 A1 | 2/2004 | Vancraeynest | |

FOREIGN PATENT DOCUMENTS

| | | | |
|---|---|---|---|
| CN | 1479831 A | | 3/2004 |
| EP | 3 68 312 A2 | | 5/1990 |
| JP | 05-83044 B2 | | 11/1993 |
| JP | 2001214334 A | * | 8/2001 |
| JP | 2003-165849 A | | 6/2003 |
| JP | 2004-084133 A | | 3/2004 |
| JP | 2004-197230 A | | 7/2004 |
| JP | 2004-149725 A | | 5/2005 |
| JP | 2005-119673 A | | 5/2005 |
| JP | 2005119673 A | * | 5/2005 |
| JP | 43-65502 B2 | | 11/2009 |
| JP | 2010-030176 A | | 2/2010 |
| WO | 02/48476 A1 | | 6/2002 |

OTHER PUBLICATIONS

Hatta et al., JP2005119673A, Description, Machine translation JAP to ENG Dec. 3, 2014.*
Nagata et al. JP2001214334A, Description, Machine translation JAP to ENG Dec. 2, 2014.*
International Search Report Dated May 20, 2011, Mailed May 31, 2011.

* cited by examiner

*Primary Examiner* — Joseph S Del Sole
*Assistant Examiner* — Lawrence D Hohenbrink, Jr.
(74) *Attorney, Agent, or Firm* — Norris McLaughlin & Marcus PA

(57) ABSTRACT

Disclosed is a carbon-fiber chopped strand, and a manufacturing method of the same. The carbon-fiber chopped strand is composed of single filaments composed of 30,000-120,000 carbon fibers, and a sizing agent content 1-10% by weight that bundles the single filaments; the ratio of maximum diameter (Dmax) in the cross section and minimum diameter (Dmin) is 1.0-1.8, a length along a fiber direction is 3-10 mm, and a repose angle of 10-30°.

10 Claims, No Drawings

CARBON-FIBER CHOPPED STRAND AND MANUFACTURING METHOD OF THE SAME

TECHNICAL FIELD

The present invention relates to a carbon-fiber chopped strand which is an important raw material for production of short-carbon-fiber-reinforced thermoplastic resin, as well as to a manufacturing method of the carbon-fiber chopped strand. More particularly, the present invention relates to a carbon-fiber chopped strand of high flowability and a manufacturing method thereof. The carbon-fiber chopped strand of the present invention can be fed smoothly from the hopper of extruder into a meter, in production of, for example, carbon fiber-containing resin pellets or carbon fiber-containing resin shaped article.

BACKGROUND ART

Short-carbon-fiber-reinforced thermoplastic resin (hereinafter referred to as "CFRTP") produced using a thermoplastic resin as a matrix resin, has drawn attention as a high-performance engineering material, and the demand therefor is increasing rapidly. This CFRTP can be produced by injection molding and accordingly is high in productivity. Moreover, the CFRTP, as compared with conventional non-reinforced thermoplastic resins or short-glass-fiber-reinforced thermoplastic resins, is superior in mechanical properties, sliding property, electrical properties, dimensional stability, etc.

As the method for producing the CFRTP, there are ordinarily the following methods.
(1) First, there is fed, into an extruder, a carbon-fiber filament bundle cut into 3 to 10 mm and bundled with a sizing agent (a so-called carbon-fiber chopped strand) or a so-called milled carbon fiber ground into 1 mm or shorter, together with pellets or a powder of thermoplastic resin; and they are melt-kneaded therein to obtain pellets. Then, the pellets are made into a CFRTP using an injection molding machine or an extrusion molding machine.
(2) A carbon-fiber chopped strand is fed into an extrusion molding machine together with pellets or a powder of thermoplastic resin to directly produce a CFRTP.

Meanwhile, as the method for feeding a carbon-fiber chopped strand and a thermoplastic resin into an extruder to produce pellets, the following methods are employed mainly.
(1) A method of dry-blending a carbon-fiber chopped strand and a thermoplastic resin and feeding the resulting blend into an extruder (a dry-blending method).
(2) A method of feeding a thermoplastic resin into the rear end side (in extrusion direction) of extruder and feeding a carbon-fiber chopped strand to the intermediate portion (in extrusion direction) of extruder wherein the fed thermoplastic resin is in a molten state (a side-feeding method).

As well known, the properties of CFRTP are related to the fiber length of the carbon fiber of CFRTP. When there is used a milled fiber of extremely short fiber length, the fiber length in the molded CFRTP is extremely short; accordingly, the properties of this CFRTP are inferior to those of CFRTP using a carbon-fiber chopped strand.

In order to keep long the fiber length of CFRTP, there is a case that a CFRTP is produced using a long fiber pellet having a fiber length same as the cut length of carbon-fiber chopped strand. In this case, the fiber direction in the CFRTP obtained is difficult to control. Therefore, this method of CFRTP production using a long fiber pellet is disadvantageous for production of an inexpensive CFRTP which needs to be mass-produced. For the above reasons, carbon-fiber chopped strand is generally used in production of CFRTP.

In production of CFRTP, when the carbon-fiber chopped strand used is low in flowability, there is a problem that stable feeding of carbon-fiber chopped strand into extruder is difficult.

In the dry-blending, when the carbon-fiber chopped strand used is low in flowability, there is a problem that the carbon-fiber chopped strand is difficult to flow down in the hopper of extruder or injection molding machine. As a result, the feeding of the carbon-fiber chopped strand in a given amount from the meter provided at the bottom of hopper, to the extrusion screw of extruder becomes unstable. For the above reason, it is difficult to obtain a CFRTP of uniform composition stably and, moreover, the production efficiency is low.

Meanwhile, in the side-feeding method as well, when the carbon-fiber chopped strand used is low in flowability, the carbon-fiber chopped strand is not fed stably into the extrusion screw of extruder and, in an extreme case, the feeding itself of the carbon-fiber chopped strand may be impossible.

For these reasons, a carbon-fiber chopped strand used industrially in a large amount is required to have high flowability. In order to respond to this requirement, it is conducted to add a sizing agent of high bundling ability to a carbon-fiber chopped strand or add a sizing agent in a large amount. It is also conducted to add another sizing agent to a carbon-fiber chopped strand obtained by cutting a strand, to mold the carbon-fiber chopped strand into a rice grain shape.

However, in producing a CFRTP by mixing the above-mentioned chopped strand containing a large amount of a sizing agent, with a heat-resistant thermoplastic resin of high processing temperature, a gas is generated by the thermal decomposition of the sizing agent. This gas allows the obtained CFRTP to have poor appearance or low weld strength (see, for example, Patent Literatures 1 and 2). Further, the thermal decomposition of the sizing agent tends to cause reduction in properties of CFRTP.

Further, in melt-kneading a chopped strand with a thermoplastic resin in an extruder, there is a case that the sizing agent added in a large amount to the carbon fiber of chopped strand reduces the dispersibility of the carbon fiber. In this case, the dispersibility of carbon fiber in the pellet obtained is insufficient. When a CFRTP is produced using this pellet, there are present, in the CFRTP produced, fiber bundles not dispersed sufficiently. The fiber bundles become a center of stress concentration, reducing the mechanical properties (particularly, tensile strength) of the CFRTP.

Meanwhile, in order to produce a chopped strand in a large amount, it is effective to increase the number of single filaments constituting the chopped strand. Chopped strands composed of 30,000 or more single filaments are known. Such a chopped strand has a flat shape. The flat shape makes easy the single-filament-state dispersion of carbon fiber in CFRTP, whereby the assembling of carbon fibers in bundle shape can be avoided.

However, the chopped strand of flat shape has a large surface area, resulting in a large contact area between chopped strands. Consequently, the chopped strand has low flowability and, in feeding the chopped strand into an extruder, there arises poor feeding into meter or extruder.

Further, the above poor feeding makes long the residence time of chopped strand in extruder. In this case, the chopped strand undergoes larger shear by the screw of extruder and the breakage of carbon fiber takes place. As a result, the fiber length becomes short, resulting in reduction in mechanical properties of the CFRTP obtained.

As described above, it has been difficult to allow a carbon-fiber chopped strand to have high flowability without reducing the dispersibility of carbon fiber and the properties of the CFRTP obtained and thereby to feed the chopped strand in a large amount in a stable state from the hopper of extruder to the extrusion screw of extruder.

Patent Literature 1: JP-A-2003-165849
Patent Literature 2: JP-A-2004-149725

DISCLOSURE OF THE INVENTION

Task to be Achieved by the Invention

The present inventor made a study in order to solve the above problems. As a result, it was found that a chopped strand obtained by adding twists of 0.5 to 50 times per meter to a carbon-fiber strand in which 30,000 or more single filaments are bundled, then adding a 1 to 10 mass % of a sizing agent to the twisted strand to bundle the single filaments, thereafter cutting the resulting strand into a given shape is highly dispersed in the CFRTP produced with the strand, unexpectedly. It was further found that this chopped strand is not flat, accordingly has high flowability, and flows down smoothly in a hopper.

In the dry-blending, when the carbon-fiber chopped strand used is low in flowability, there is a problem that the carbon-fiber chopped strand is difficult to flow down in the hopper of extruder or injection molding machine. As a result, the feeding of the carbon-fiber chopped strand in a given amount from the meter provided at the bottom of hopper, to the extrusion screw of extruder becomes unstable. For the above reason, it is difficult to obtain a CFRTP of uniform composition stably and, moreover, the production efficiency is low.

Means for Achieving the Task

The above aim of the present invention can be achieved by following various inventions of the present invention.

[1] A carbon-fiber chopped strand composed of 30,000 to 120,000 carbon fiber single filaments and 1 to 10 mass % of a sizing agent which bundles the single filaments, in which carbon-fiber chopped strand the ratio (Dmax/Dmin) of the maximum diameter (Dmax) and the minimum diameter (Dmin) both of the section of chopped strand is 1.0 to 1.8, the length (L) of chopped strand along the fiber direction is 3 to 10 mm, and the repose angle of chopped strand is 10 to 30°.

[2] The carbon-fiber chopped strand according to [1], wherein the ratio (L/Dmin) of the length (L) of chopped strand along the fiber direction and the minimum diameter (Dmin) of chopped strand is 4 or smaller.

[3] The carbon-fiber chopped strand according to [1], wherein the sizing agent is a polyamide resin.

[4] A method for manufacturing a carbon-fiber chopped strand set forth in [1], characterized by comprising
a step of twisting, by 0.5 to 50 times per meter, an untwisted carbon-fiber strand composed of 30,000 to 120,000 single filaments,
a step of introducing the twisted carbon-fiber strand into a sizing agent bath, followed by drying, to adhere 1 to 10 mass % of the sizing agent to the twisted carbon-fiber strand to allow a carbon-fiber strand bundled, and
a step of cutting the carbon-fiber strand bundled into a given length.

[5] The method for manufacturing a carbon-fiber chopped strand, set forth in [4], wherein the sizing agent is a polyamide resin and the sizing agent concentration in sizing agent bath is 0.5 to 30 mass %.

[6] An assembly of carbon-fiber chopped strands each composed of 30,000 to 120,000 carbon fiber single filaments and 1 to 10 mass % of a sizing agent which bundles the single filaments, in each carbon-fiber chopped strand the ratio (Dmax/Dmin) of the maximum diameter (Dmax) and the minimum diameter (Dmin) both of the section of chopped strand being 1.0 to 1.8, the length (L) of chopped strand along the fiber direction being 3 to 10 mm, and the repose angle of chopped strand being 10 to 30°, in which assembly the remaining ratio of original carbon-fiber chopped strands bundled is 70% or higher.

[7] A package of carbon-fiber chopped strands, comprising
carbon-fiber chopped strands each composed of 30,000 to 120,000 carbon fiber single filaments and 1 to 10 mass % of a sizing agent which bundles the single filaments, in each carbon-fiber chopped strand the ratio (Dmax/Dmin) of the maximum diameter (Dmax) and the minimum diameter (Dmin) both of the section of chopped strand being 1.0 to 1.8, the length (L) of chopped strand along the fiber direction being 3 to 10 mm, and the repose angle of chopped strand being 10 to 30°, and
a flexible container bag which packs the carbon-fiber chopped strands,
in which package the remaining ratio of original carbon-fiber chopped strands bundled is 70% or higher.

[8] A method for manufacturing pellets each composed of a thermoplastic resin and a carbon fiber dispersed in the thermoplastic resin, using an extruder, which method comprising
a step of feeding directly into the hopper of an extruder from a flexible container bag, carbon-fiber chopped strands each composed of 30,000 to 120,000 carbon fiber single filaments and 1 to 10 mass % of a sizing agent which bundles the single filaments, in which carbon-fiber chopped strands the ratio (Dmax/Dmin) of the maximum diameter (Dmax) and the minimum diameter (Dmin) both of the section of chopped strand is 1.0 to 1.8, the length (L) of chopped strand along the fiber direction is 3 to 10 mm, and the repose angle of chopped strand is 10 to 30°, and
a step of kneading, in the extruder, the carbon-fiber chopped strands with a resin.

Effect of the Invention

In the carbon-fiber chopped strand of the present invention, there is used, as the raw material, a carbon-fiber strand obtained by impregnating a given amount of a sizing agent into a carbon-fiber strand composed of 30,000 to 120,000 single filaments. Since this carbon-fiber strand has a twist of 0.5 to 50 times per meter, the carbon-fiber chopped strand of the present invention obtained by cutting the strand is superior in bundling ability and hardly has a flat sectional shape. Consequently, the present carbon-fiber chopped strand is superior in flowability.

Accordingly, when the present carbon-fiber chopped strand is fed into the hopper of extruder, the strand flows down smoothly in the hopper and the strand is fed stably into the meter of extruder. As a result, the chopped strand can be fed stably to the extrusion screw of extruder.

The present carbon-fiber chopped strand can be fed stably into an extruder, as mentioned above; therefore, there is hardly fluctuation in the time in which the strand passes through the extruder, enabling the shortening of the residence time of chopped strand in extrusion screw. As a result, there is little cutting of strand in kneading in extrusion screw, whereby is obtained a molding material in which a long fiber is dispersed. For this reason, there can be obtained, by using the molding material, a molded article of excellent mechanical properties.

Best Mode for Carrying out the Invention

The carbon-fiber chopped strand of the present invention is produced by the following method.

The carbon fiber used as a raw material in production of the present carbon-fiber chopped strand is a filament-like carbon fiber which can be twisted.

As the carbon fiber, there can be used, for example, a carbon fiber of polyacrylonitrile (PAN) type, rayon type, pitch type or the like (including a graphite fiber) and a carbon fiber obtained by coating a metal on the surface of the former carbon fiber.

The single-filament diameter of the carbon fiber is preferably 3 to 15 μm, more preferably 5 to 10 μm.

The carbon fiber is produced by a known method and is ordinarily supplied in the form of strand. The number of the single filaments constituting the strand is preferably 30,000 to 120,000, more preferably 40,000 to 110,000, particularly preferably 50,000 to 100,000.

In the current manufacturing method of the carbon fiber, the production cost depends upon the number of the single filaments constituting a strand and the diameter of single filament. Accordingly, a strand composed of single filaments of less than 30,000 is usable but is high in production cost. Moreover, such a strand is not economical as a reinforcing material for CFRTP which needs to be low in cost.

A strand composed of single filaments of more than 120,000 is difficult to impregnate a sizing agent thereinto, in adhering the sizing agent to the strand. Therefore, in the sizing agent-adhered strand, the bundling ability tends to be low. Such a strand tends to be split along the fiber axis direction of strand, in cutting of strand into chopped strand. Further, it is not preferable, because the strand tends to be low in uniform dispersibility of carbon fibers in the pellets or CFRTP produced by melt-kneading of chopped strand with resin.

The mass per unit length, of single filament is appropriately 0.8 to 8.0 g/m.

The above-mentioned carbon-fiber strand is then twisted 0.5 to 50 times per meter. When the twist is less than 0.5 times per meter, the chopped strand obtained has a flat sectional shape. That is, there is obtained a carbon-fiber chopped strand of flat shape, having a ratio (Dmax/Dmin) of the maximum diameter (Dmax) and the minimum diameter (Dmin) both of the section of chopped strand, of larger than 1.8. As a result, the chopped strand has low flowability.

When the twist is more than 50 times per meter, the sizing agent hardly impregnates into the inner portion of fiber bundle. As a result, when the fiber strand is cut, the carbon fibers of the inner portion of strand, not impregnated with the sizing agent are released outside and form a mass of cotton-fiber-like fluff, resulting in a chopped strand of low flowability.

The carbon-fiber strand twisted 0.5 to 50 times per meter may be produced also by a method of twisting a precursor (a carbon fiber precursor) such as oxidized fiber bundle or the like and then carbonizing the twisted precursor according to an ordinary means.

It is ordinarily preferred that the twist is applied after the carbonization of the precursor. When the twist is applied to a carbon fiber strand after carbonization, a sizing agent may be adhered to a non-twisted carbon fiber strand and then twist may be applied. Or, twist may be applied before adhesion of sizing agent and then a sizing agent may be adhered. It is generally preferred that twist is applied and then a sizing agent is adhered.

The sizing agent used in the present invention is preferably various thermoplastic resins and thermosetting resins. There can be mentioned, for example, epoxy resin, urethane-modified epoxy resin, polyester resin, phenolic resin, polyamide resin, polyurethane resin, polycarbonate resin, polyetherimide resin, polyamideimide resin, polystyrpyridine resin, polyimide resin, bismaleimide resin, polysulfone resin, polyethersulfone resin, epoxy-modified urethane resin, polyvinyl alcohol resin, polyvinylpyrrolidone resin, and modified resins thereof. Mixtures thereof are also used. Of them, epoxy resin, urethane-modified epoxy resin, polyurethane resin and polyamide resin are preferred, and polyamide resin is particularly preferred for the wide usability, easy handling and high function. As the polyamide resin, 8 Nylon (trade mark) which is a soluble nylon resin, is particularly preferred.

The amount of the sizing agent adhered to the carbon-fiber strand is 1 to 10 mass %, preferably 3 to 8 mass %, more preferably 4 to 7 mass %, based on the total mass of carbon fiber strand and sizing agent.

When the amount of sizing agent is less than 1 mass %, the carbon-fiber chopped strand obtained has low bundling ability and tends to split during the transportation and handling.

When the amount of sizing agent is more than 10 mass %, the dispersibility of carbon fibers is low in kneading of carbon-fiber strand with molten resin to produce pellets or CFRTP. As a result, the pellets or the like obtained is low in mechanical properties. Further, the amount of the thermal decomposition gas generated in kneading is large, deteriorating the CFRTP produced. Furthermore, cutting of strand is difficult, tending to produce a chopped strand having a flat sectional shape. Therefore, the section of chopped strand hardly becomes a shape close to a circle, resulting in low flowability.

The sizing agent is adhered to the carbon-fiber strand ordinarily in the form of a solution dissolved in a solvent or a dispersion dispersed in a solvent. As the solvent, there is selected from water, an alcohol (e.g. ethyl alcohol or methyl alcohol), a ketone (e.g. acetone or methyl ethyl ketone), an aromatic solvent (e.g. toluene or xylene), dichloromethane, N-methylpyrrolidone, dimethylformamide, tetrahydrofuran, etc., depending upon the kind of the sizing agent used. An appropriate mixture thereof may also be selected. The concentration of sizing agent in sizing agent solution or sizing agent dispersion is preferably 0.5 to 30 mass %.

In order to adhere the sizing agent to the carbon-fiber strand, there is employed a known method, for example, a method of dipping a carbon-fiber strand in a sizing agent solution or a method of spraying a sizing agent solution using a spray nozzle.

The sizing agent-adhered carbon-fiber strand is then dried by a known method. The drying is conducted, for example, by passing the strand through an air dryer or the like. The drying temperature is preferably 50 to 200° C. By such drying, the section of carbon-fiber strand intersecting at right angles with the fiber axis direction becomes nearly circular spontaneously owing to the twisting and the bundling action of sizing agent, and the ratio (Dmax)/(Dmin) of the maximum diameter (Dmax) and the minimum diameter (Dmin) both of the section comes to fall in a range of 1.0 to 1.8.

Incidentally, in the above drying, the shaping of the section of the sizing agent-adhered carbon-fiber strand may be conducted using a grooved roller. The sectional shape of the groove of roller is preferably a U shape.

The carbon-fiber strand bundled produced as above is then cut into 3 to 10 mm, preferably 5 to 8 mm, whereby the carbon-fiber chopped strand of the present invention is obtained. The average diameter of the present carbon-fiber chopped strand differs depending upon the number of bundled single filaments but is ordinarily 1 to 10 mm.

In the present carbon-fiber chopped strand, the ratio (Dmax/Dmin) of the maximum diameter (Dmax) and the minimum diameter (Dmin) in a section intersecting at right angles with the fiber axis direction is 1.0 to 1.8, preferably 1.0 to 1.6. A ratio exceeding 1.8 is not preferred because the contact area between strands is large and the flowability of strand is low.

In the present chopped strand, the fiber length (L) is preferably 3 to 10 mm, more preferably 5 to 8 mm. A fiber length of chopped strand exceeding 10 mm is not preferred because the contact area between strands is large and the flowability of strand is low. Meanwhile, a fiber length of chopped strand of shorter than 3 mm is not preferred because no sufficient reinforcing effect is obtained when a fiber-reinforced composite material has been produced.

The ratio (L/Dmin) of the fiber length (L) of chopped strand and the minimum diameter (Dmin) of chopped strand is preferably 4 or smaller, more preferably 3 or smaller. With a ratio of larger than 4, the contact area between strands is large and the flowability of strand may be low.

The flowability of carbon-fiber chopped strand is evaluated by its repose angle. The repose angle is measured by a method described later. A smaller repose angle is interpreted to indicate a higher flowability. The repose angle of a chopped strand interpreted to have good flowability is preferably 30° or smaller, more preferably 25° or smaller. A repose angle exceeding 30° is not preferred because the chopped strand does not flow down stably in feeding of chopped strand in hopper, into extruder. A repose angle of smaller than 10° is not preferred because the chopped strand has too high flowability, making difficult the handling thereof.

The bulk density of carbon-fiber chopped strand is indicated by the mass of chopped strand per given volume (1 L). The bulk density of the present carbon-fiber chopped strand is preferably 200 g/L or higher, more preferably 250 g/L, particularly preferably 300 g/L or higher. The upper limit of the bulk density is ordinarily 700 g/L.

In general, when the bulk density is 150 g/L or lower, the frictional resistance at the interface between chopped strands is larger than the gravity which each chopped strand receives. As a result, there appear, in the hopper, those chopped strands unable to flow down partly.

The stability of shape retainability of chopped strand can be examined by measuring the ratio of generation of free fiber. The ratio of generation of free fiber is desirably 3% or lower. When the ratio of generation of free fiber is 5% or higher, the shape of chopped strand is not retainable during the transportation of chopped strand or in feeding of chopped strand from hopper into extruder, and the opening of chopped strand takes place. As a result, cotton-like masses are formed, reducing the flowability of chopped strand.

The ratio of generation of free fiber was measured by the following method.

A carbon-fiber chopped strand was dropped into a 500-ml beaker from a height of 30 cm above the beaker. The carbon-fiber chopped strand was fed until the strand piled up in the beaker so as to exceed the upper end of the beaker and dropped from the upper end of the beaker. Then, a glass rod was moved along the upper end of the beaker to remove the portion of carbon-fiber chopped strand projecting upward from the upper end surface of the beaker. Then, the mass (W1 g) of the carbon-fiber chopped strand in the beaker was measured.

Then, the carbon-fiber chopped strand was transferred into a 2,000-ml graduated cylinder, and the cylinder was sealed tightly. The graduated cylinder was rotated at 25 rpm for 20 minutes on the axis of graduated cylinder. The rotation of graduated cylinder was stopped and the carbon-fiber chopped strand was transferred onto a sieve (3 meshes). The sieve was moved in all directions until there was no dropping of carbon-fiber chopped strand from the eyes of sieve, for sifting of carbon-fiber chopped strand. The free fiber remaining on the sieve was collected and its mass (W2 g) was measured. The ratio of generation of free fiber was calculated using the following formula.

$$\text{Ratio of generation of free fiber (\%)} = (W2/W1) \times 100$$

The chopped strand of the present invention is packed in a flexible container bag or the like, in a state of assembly of a large number of chopped strands, and is supplied to a pellet production step. In this case, it is preferred that the chopped strands of assembly form or package form do not split into chopped strands of smaller number of single filaments and stably keep the chopped strands of original number of single filaments.

The degree of splitting of strands is indicated by the remaining ratio of original carbon-fiber chopped strands which is described later. The remaining ratio of original carbon-fiber chopped strands is preferably 50% or higher, more preferably 70% or higher. A remaining ratio of original carbon-fiber chopped strands, of lower than 50% is not preferred because the contact area between strands is large and the flowability of chopped strand is low.

The packing of chopped strands can be conducted using a known method. A method of using a flexible container bag is preferably used. The flexible container bag is a bag-shaped packing material which is used for storage or transportation of powdery substance or granular substance. As the flexible container bag, a commercial product can be used appropriately. The flexible container bag is preferably a type which can be opened at the bottom. The flexible container bag makes easy the feeding operation of chopped strands into hopper.

By employing the above operation, the carbon-fiber chopped strand of the present invention can be obtained.

EXAMPLES

The present invention is described more specifically below by way of Examples. However, the present invention is in no way restricted by these Examples.

(Decomposition Method by Sulfuric Acid)

The quantitative determination of sizing agent was conducted by so-called decomposition method by sulfuric acid which is described below.

2 g (W1) of a carbon-fiber chopped strand was placed in a 200-ml conical beaker and weighed accurately. 100 ml of concentrated sulfuric acid was added and the beaker was covered with a watch glass. The beaker was heated at about 200° C. for 1 hour to thermally decompose the sizing agent of the chopped strand. After cooling, an aqueous hydrogen peroxide solution was added into the beaker in small portions until the solution in the beaker became transparent. Then, the carbon fiber in the beaker was separated by filtration, using an accurately weighed glass filter (W2). The separated carbon fiber was washed with about 1,000 ml of water and then the glass filter containing the carbon fiber was dried at 110±3° C.

for 2 hours. The mass (W3) of the glass filter containing the carbon fiber, after drying was weighed accurately.

The amount of the sizing agent adhered was determined by the following formula.

Amount of sizing agent adhered (mass %)=($W1$-($W3$-$W2$))×100/$W1$ (Remaining Ratio of Original Chopped Strands)

1 g of chopped strands was weighed. There were measured the total number of the weighed chopped strands and the number of original chopped strands each retaining the original number of single filaments. Using these measurement data, the remaining ratio of original chopped strands each retaining the original number of single filaments was calculated.

(Bulk density) 300 g of chopped strands was filled in a 2-L graduated cylinder. Slight impact was applied continuously. A volume of the chopped strands was measured when there was no change in the volume of the chopped strands filled. Using this volume and the mass of the chopped strands, the bulk density of the chopped strands was calculated.

(Measurement Method of Repose Angle)

40 g of carbon-fiber chopped strands was filled in a funnel having a lower diameter of 18 mm, and was allowed to fall freely onto a floor surface from a height of 100 mm. There were measured the height (h) of the chopped strands accumulated on the floor surface and a half of the diameter (r) of floor area on which the chopped strands piled up. The angle (repose angle, 0) formed by the floor surface and the slope of chopped strand mountain was calculated using the following formula.

$\tan \theta = h/r$

Examples 1 to 6 and Comparative Examples 1 to 4

A non-twisted, PAN-based carbon-fiber strand (Tenax STS 40-48K, a product of Toho Tenax Co., Ltd.) composed of 48,000 single filaments was twisted continuously to obtain carbon-fiber strands each having a twist described in Table 1. Each twisted carbon-fiber strand was introduced continuously into a sizing agent bath at a speed of 4 m/min to impregnate the strand with the sizing agent. The sizing agent was a methanol solution of soluble 8 Nylon Resin (LUCKAMIDE 5003, a product of DIC Co., Ltd.). In this case, the concentration of sizing agent solution was adjusted to control the sizing agent amount in carbon-fiber strand, at a level shown in Table 1. By this operation, each carbon-fiber strand received a bundling treatment.

The resulting carbon-fiber strand was passed through a grooved roller (the groove had a rectangular sectional shape of 3 mm in width and 2 mm in depth). Then, each carbon-fiber strand was sent to an air drier (140° C.) to dry the strand. The strand came to have a roughly circular section by being passed through the grooved roller. Then, each dried carbon-fiber strand was cut into a length of 6 mm to obtain carbon-fiber chopped strands. The carbon-fiber chopped strands were measured for repose angle and bulk density by the above-mentioned methods. Next, 200 kg of the carbon-fiber chopped strands was packed in a flexible container bag which was openable at the bottom. Then, the carbon-fiber chopped strands packed in the flexible container bag were measured for remaining ratio of original carbon-fiber chopped strands. The results are shown in Table 1.

Example 7

Three same, non-twisted, PAN-based carbon-fiber strands (Tenax STS 40-12K, a product of Toho Tenax Co., Ltd.) each composed of 12,000 single filaments were combined to obtain a carbon-fiber strand composed of 36,000 single filaments. Then, the carbon-fiber strand was subjected to the same operation as in Example 1 except that a twist was applied thereto, to obtain carbon-fiber chopped strands. The results are shown in Table 1.

Example 8

Two same, non-twisted, PAN-based carbon-fiber strands (Tenax STS 40-48K, a product of Toho Tenax Co., Ltd.) each composed of 48,000 single filaments were combined to obtain a carbon-fiber strand composed of 96,000 single filaments. Then, the carbon-fiber strand was subjected to the same operation as in Example 1 except that a twist was applied thereto, to obtain carbon-fiber chopped strands. The results are shown in Table 1.

Example 9

Five same, non-twisted, PAN-based carbon-fiber strands (Tenax STS 40-24K, a product of Toho Tenax Co., Ltd.) each composed of 24,000 single filaments were combined to obtain a carbon-fiber strand composed of 120,000 single filaments. Then, the carbon-fiber strand was subjected to the same operation as in Example 1 except that a twist was applied thereto, to obtain carbon-fiber chopped strands. The results are shown in Table 1.

Comparative Example 5

A non-twisted, PAN-based carbon-fiber strand (Tenax STS 40-12K, a product of Toho Tenax Co., Ltd.) composed of 12,000 single filaments was twisted continuously in the same manner as in Example 1, to obtain carbon-fiber chopped strands. The results are shown in Table 1.

Comparative Example 6

A non-twisted, PAN-based carbon-fiber strand (Tenax STS 40-24K, a product of Toho Tenax Co., Ltd.) composed of 24,000 single filaments was twisted and subjected to the same operation as in Example 1, to obtain carbon-fiber chopped strands. However, the carbon-fiber chopped strands had a high repose angle, of 32° because the number of single filaments was small.

Comparative Example 7

Five same, non-twisted, PAN-based carbon-fiber strands (Tenax STS 40-48K, a product of Toho Tenax Co., Ltd.) each composed of 48,000 single filaments were combined to obtain a carbon-fiber strand composed of 240,000 single filaments. Then, the carbon-fiber strand was subjected to the same operation as in Example 1 except that a twist was applied thereto, to obtain carbon-fiber chopped strands. However, the number of single filaments was too large; the step of adhesion of sizing agent and the step of strand cutting were unstable; and it was impossible to obtain chopped strands having intended properties.

[Table1]

TABLE 1

| | Number of filaments | Twist (times/ meter) | Sizing agent adhered | Dmin (mm) | Dmax (mm) | Dmax/ Dmin | L/Dmin | Remaining ratio of original carbon-fiber chopped strand | Bulk density (g/liter) | Repose angle |
|---|---|---|---|---|---|---|---|---|---|---|
| Example 1 | 48,000 | 3 | 5.0% | 1.97 | 2.18 | 1.11 | 3.05 | 83.3% | 458 | 25° |
| Example 2 | 48,000 | 6 | 4.8% | 2.00 | 2.14 | 1.07 | 3.00 | 71.4% | 438 | 28° |
| Example 3 | 48,000 | 1 | 5.4% | 1.88 | 2.73 | 1.45 | 3.19 | 74.2% | 461 | 29° |
| Example 4 | 48,000 | 30 | 4.6% | 1.62 | 1.98 | 1.22 | 3.70 | 70.2% | 375 | 30° |
| Example 5 | 48,000 | 3 | 3.0% | 1.83 | 2.45 | 1.34 | 3.28 | 75.0% | 464 | 27° |
| Example 6 | 48,000 | 3 | 9.0% | 2.03 | 2.09 | 1.03 | 2.96 | 98.0% | 480 | 28° |
| Example 7 | 36,000 | 3 | 5.1% | 1.63 | 1.84 | 1.13 | 3.68 | 92.0% | 447 | 28° |
| Example 8 | 96,000 | 3 | 5.1% | 3.70 | 4.04 | 1.09 | 1.62 | 71.4% | 288 | 29° |
| Example 9 | 120,000 | 3 | 5.0% | 4.50 | 7.56 | 1.68 | 1.33 | 70.3% | 210 | 30° |
| Comparative Example 1 | 48,000 | 0 | 4.3% | 1.68 | 3.31 | 1.97 | 3.57 | 58.8% | 462 | 34° |
| Comparative Example 2 | 48,000 | 100 | 4.2% | 1.34 | 2.47 | 1.84 | 4.48 | 57.2% | 100 | 45° |
| Comparative Example 3 | 48,000 | 3 | 0.5% | 1.33 | 2.62 | 1.97 | 4.51 | 43.6% | 95 | 53° |
| Comparative Example 4 | 48,000 | 3 | 14.2% | 1.53 | 2.34 | 1.53 | 3.92 | 100.0% | 570 | 36° |
| Comparative Example 5 | 12,000 | 3 | 6.0% | 0.95 | 1.12 | 1.18 | 6.32 | 100.0% | 430 | 32° |
| Comparative Example 6 | 24,000 | 3 | 5.8% | 1.34 | 1.55 | 1.16 | 4.48 | 96.3% | 442 | 32° |
| Comparative Example 7 | 240,000 | 3 | Unstable steps made it impossible to obtain an intended product. | | | | | | | |
| Example 10 | 48,000 | 3 | 7.0% | 1.85 | 2.45 | 1.40 | 3.24 | 73.0% | 405 | 28° |
| Example 11 | 48,000 | 3 | 3.0% | 1.83 | 2.45 | 1.34 | 3.28 | 77.0% | 385 | 29° |

Example 10

An operation was made in the same manner as in Example 1 except that there was used, as a sizing agent, an acetone solution of a urethane-modified epoxy resin (Adeka Resin EPU-4-75X, a product of ADEKA Co., Ltd.), to obtain carbon-fiber chopped strands. The results are shown in Table 1.

Example 11

An operation was made in the same manner as in Example 1 except that there was used, as a sizing agent, an aqueous dispersion of a polyurethane resin (Dispercoll U-54, a product of Bayer Co., Ltd.) to obtain carbon-fiber chopped strands. The results are shown in Table 1.

Examples 12 to 22

Each 200 kg of the carbon-fiber chopped strands obtained in Examples 1 to 11 was packed in a flexible container bag which was openable at the bottom, and supplied to a pellet-producing step. That is, the package was hoisted by a crane; the bottom of the bag was opened; the carbon-fiber chopped strands were fed into a hopper of extruder at one time by an amount filling the whole capacity of the hopper.

Each of the carbon-fiber chopped strands obtained in Examples 1 to 11 had a low repose angle, 30° or smaller and had excellent flowability. Therefore, a large amount of the carbon-fiber chopped strands in the hopper caused no clogging of fluff and was supplied stably from the hopper to a meter.

Comparative Examples 8 to 13

Each 200 kg of the carbon-fiber chopped strands obtained in Comparative Examples 1 to 6 was subjected to the same operation as in Example 12; that is, the strands of 200 kg was packed in a flexible container bag which was openable at the bottom, and was supplied to a pellet-producing step.

Comparative Example 8

In the carbon-fiber chopped strands obtained in Comparative Example 1, there was no twist of carbon fiber; therefore, the Dmax/Dmin was large at 1.97. That is, the section of chopped strand was flat; therefore, the contact area between strands was large. As a result, the chopped strands had a repose angle 34° and had low flowability. Clogging of fluff occurred in the hopper and the stable supply of chopped strands into meter was impossible.

Comparative Example 9

The carbon-fiber chopped strands obtained in Comparative Example 2 had too large a twist of 100 times per meter; therefore, there was no impregnation of sizing agent into the inner portion of strand. Therefore, there was little bundling of fibers in strand. That is, the Dmax/Dmin was large at 1.84 and the remaining ratio of original bundles was low. The repose angle was 45° and the chopped strands had low flowability. Consequently, clogging of fluff occurred in the hopper and the stable supply of chopped strands into meter was impossible.

Comparative Example 10

In the carbon-fiber chopped strands obtained in Comparative Example 3, the amount of sizing agent adhered was small at 0.5 mass % and, therefore, there was no sufficient bundling of fibers. That is, the Dmax/Dmin was large at 1.97 and the remaining ratio of original bundles was low. The repose angle was 53° and the chopped strands had low flowability. Consequently, clogging of fluff occurred in the hopper and the stable supply of chopped strands into meter was impossible.

Comparative Example 11

In the carbon-fiber chopped strands obtained in Comparative Example 4, the amount of sizing agent adhered was large at 14.2 mass % and, accordingly, the surface of chopped strand was not smooth. That is, the repose angle was 36° and the flowability was low. Clogging of fluff occurred in the hopper and the stable supply of chopped strands into meter was impossible.

In the kneading of resin and carbon-fiber chopped strands in extruder, the dispersion of carbon-fiber chopped strands in resin was inferior, making it impossible to obtain pellets of good quality.

Comparative Example 12

In the carbon-fiber chopped strands obtained in Comparative Example 5, the number of carbon fiber single filaments used was small at 12,000. Accordingly, the chopped strands obtained had a small diameter. As a result, the ratio of fiber length (L) and minimum diameter (Dmin) was large at 6.32. That is, the contact area was large; therefore, the repose angle exceeded 30° and the chopped strands had low flowability. Clogging of fluff occurred in the hopper and the stable supply of chopped strands into meter was impossible.

Comparative Example 13

In the carbon-fiber chopped strands obtained in Comparative Example 6, the number of carbon fiber single filaments used was small at 24,000. Accordingly, the chopped strands obtained had a small diameter. As a result, the ratio of fiber length (L) and minimum diameter (Dmin) was large at 4.48. That is, the contact area was large; therefore, the repose angle was large at 32° and the chopped strands had low flowability. As a result, clogging of fluff occurred in the hopper and the stable supply of chopped strands into meter was impossible.

The invention claimed is:

1. A carbon-fiber chopped strand composed of 30,000 to 120,000 carbon fiber single filaments and 1 to 10 mass % of a sizing agent which bundles the single filaments, in which the single-filament diameter of carbon fiber is 3 to 15 μm, carbon-fiber chopped strand the ratio (Dmax/Dmin) of the maximum diameter (Dmax) and the minimum diameter (Dmin) in a section intersecting at right angles with the fiber axis direction of chopped strand is 1.0 to 1.8, the length (L) of chopped strand along the fiber direction is 3 to 10 mm, the ratio (L/Dmin) of the length (L) of chopped strand along the fiber direction and the minimum diameter (Dmin) of chopped strand is 4 or smaller, and the repose angle of chopped strand is 10 to 30°.

2. The carbon-fiber chopped strand according to claim 1, wherein the sizing agent is a polyamide resin.

3. The carbon-fiber chopped strand according to claim 1, wherein the remaining ratio of original carbon-fiber chopped strands bundled is 70% or higher.

4. The carbon-fiber chopped strand according to claim 1, wherein the bulk density of carbon-fiber chopped strand is 200 to 700 g/L.

5. The carbon-fiber chopped strand according to claim 1, wherein the average diameter of carbon-fiber chopped strand is 1 to 10 mm.

6. A method for manufacturing a carbon-fiber chopped strand set forth in claim 1, comprising
a step of twisting, by 0.5 to 50 times per meter, an untwisted carbon-fiber strand composed of 30,000 to 120,000 single filaments having 3 to 15 μm diameter,
a step of introducing the twisted carbon-fiber strand into a sizing agent bath, followed by shaping using a grooved roller and drying, to adhere 1 to 10 mass % of the sizing agent to the twisted carbon-fiber strand to allow a carbon-fiber strand bundled, and
a step of cutting the carbon-fiber strand bundled *twisted 0.5 to 50 times per meter into a given length.

7. The method for manufacturing a carbon-fiber chopped strand, set forth in claim 6, wherein the sizing agent is a polyamide resin and the sizing agent concentration in sizing agent bath is 0.5 to 30 mass %.

8. An assembly of carbon-fiber chopped strands each composed of the carbon-fiber chopped strand set forth in claim 1 in which assembly the remaining ratio of original carbon-fiber chopped strands bundled is 70% or higher.

9. A package of carbon-fiber chopped strands, comprising
a plurality of carbon-fiber chopped strands as set forth in claim 1, and
a flexible container bag which packs the carbon-fiber chopped strands,
in which package the remaining ratio of original carbon-fiber chopped strands bundled is 70% or higher.

10. A method for manufacturing pellets each composed of a thermoplastic resin and a single carbon fiber filament dispersed in the thermoplastic resin, using an extruder, which method comprising
a step of feeding directly into a hopper of an extruder from a flexible container bag, a plurality of carbon-fiber chopped strands as set forth in claim 1, and
a step of kneading, in the extruder, the carbon-fiber chopped strands with a thermoplastic resin.

* * * * *